United States Patent [19]

Kaplan et al.

[11] Patent Number: 5,551,049
[45] Date of Patent: Aug. 27, 1996

[54] THESAURUS WITH COMPACTLY STORED WORD GROUPS

[75] Inventors: Ronald M. Kaplan, Palo Alto; Martin Kay, Menlo Park, both of Calif.

[73] Assignee: Xerox Corporation, Stamford, Conn.

[21] Appl. No.: 575,032

[22] Filed: Aug. 30, 1990

Related U.S. Application Data

[63] Continuation of Ser. No. 53,978, May 26, 1987, abandoned.
[51] Int. Cl.$^6$ .................................................. G06F 9/00
[52] U.S. Cl. ...................... 395/800; 364/419.11; 364/975
[58] Field of Search .......................... 364/200 MS File, 364/900 MS File, 419.11; 395/800, 600

[56] References Cited

U.S. PATENT DOCUMENTS

| | | | |
|---|---|---|---|
| 3,350,695 | 10/1967 | Kaufman et al. | 364/300 |
| 4,542,477 | 9/1985 | Noyori et al. | 364/900 |
| 4,658,374 | 4/1987 | Tanimoto et al. | 364/900 |
| 4,724,523 | 2/1988 | Kucera | 364/419 |
| 4,731,021 | 3/1988 | Chan | 434/156 |
| 4,748,589 | 5/1988 | Kanou et al. | 364/900 |
| 4,758,955 | 7/1988 | Chen | 364/419 |
| 4,771,385 | 9/1988 | Egami et al. | 364/900 |
| 4,773,009 | 9/1988 | Kucera et al. | 364/419 |
| 4,777,600 | 11/1988 | Saito | 364/419 |
| 4,799,188 | 1/1989 | Yoshimura | 364/900 |
| 4,799,191 | 1/1989 | Yoshimura | 364/900 |
| 4,831,529 | 5/1989 | Miike et al. | 364/419 |
| 4,882,703 | 11/1989 | Nicolai | 364/900 |
| 5,450,598 | 9/1995 | Kaplan et al. | 395/800 |

FOREIGN PATENT DOCUMENTS

| | | | |
|---|---|---|---|
| 0282721 | 9/1988 | European Pat. Off. | G06F 15/20 |
| 0286719 | 10/1988 | European Pat. Off. | H03M 7/42 |
| 2177830 | 1/1987 | United Kingdom . | |

OTHER PUBLICATIONS

European Search Report and Annex, Application No. EP 93 30 8297, sent with communication dated Mar. 23, 1994.
Borgendale, K. W. and Carlgren, R. G., "Indirect Reference Synonym Data Storage Technique," *IBM Technical Disclosure Bulletin*, vol. 26, No. 11, Apr. 1984, p. 6094.
Turba, T. N., "Checking for Spelling and Typographical Errors in Computer-Based Text," *SIGPLAN Notices*, vol. 16, No. 6, Jun. 1981, pp. 51–60.

*Primary Examiner*—Mehmet B. Geckil

[57] ABSTRACT

A thesaurus receives a word and uses a word list to obtain a corresponding number. The corresponding number is then compared with numbers grouped in sequence to represent synonym groups. For each match, information about the group including the matching number is determined based on the sequential position of the matching number. This information may include the group's part of speech, its length, and the positions of its members. The numbers in the group are retrieved and the corresponding synonymous words are obtained, again using the word list. Tables contain data used to determine the information about a group containing a matching number. The groups are sorted by part of speech and one table contains information about the ending position of each part of speech so that a group's part of speech can be determined from the position of any number in it. The groups within each part of speech are sorted by length and another table contains the number of groups of each length so that a group's length and the positions of its numbers can be determined from the position of any number in it. Each group is also sorted by number so that if a candidate number is less than a number being compared, the remaining numbers in that group can be skipped. The groups of equal length within a part of speech are sorted by first number so that if a candidate number is less than the first number of a group, the remaining groups of that length can be skipped. Each number is in one or more parts, at least one of which may be less than a full byte. The full byte is an integral multiple of each part's length, so that each part can be accessed and compared in a single cycle.

46 Claims, 7 Drawing Sheets

5,551,049

THESAURUS WITH COMPACTLY STORED WORD GROUPS

This is a continuation, of application Ser. No. 07/053,978, filed May 26, 1987, now abandoned.

BACKGROUND OF THE INVENTION

The present invention relates to retrieval of information associated with a word or other token. The invention relates specifically to retrieving synonyms or other words related to a given word, as in a thesaurus.

A number of techniques for finding synonyms or antonyms of a given word are known. One known technique involves storing the words themselves in groups of synonyms. In order to distinguish between homonyms, the part of speech may be included in each group. A scan of the stored groups finds the synonyms of an input word by finding the groups in which it is included. Alternatively, a table may be provided listing the addresses of the synonym groups containing the input word, and those groups may then be accessed directly.

U.S. Pat. No. 4,384,329 describes another technique for accessing synonyms and antonyms in which the first few characters of an input word are used to search an index for an address of a segment of a vocabulary data base containing the input word. That segment is then searched for a matching word with which is stored a word number, which is the row and column corresponding to the input word in a synonym or antonym matrix. The matrix is then accessed to retrieve a row of encoded synonymy information, which is then decoded into column displacements. The displacements are converted into a list of synonym word numbers, and these numbers are decoded into the synonyms themselves, again using the index. This technique thus involves converting an input word to a number, using that number to retrieve the numbers of its synonyms, and converting the synonym numbers to the synonymous words.

Raskin, R., "Electronic Thesauri: Four Ways to Find the Perfect Word", *PC Magazine,* Jan. 13, 1987, pp. 275–283, describes four thesauri for a personal computer, each of which retrieves synonyms of a word provided by the user. As shown in the table on page 280, each of these thesauri requires both resident memory and disk space. The amount of resident memory employed ranges from 30K to 65K, and the amount of disk space from 160K to 360K. As noted on page 276, this can result in bothersome disk-swapping.

U.S. Pat. No. 4,653,199 describes a pivot type machine translating system which makes use of a thesaurus as shown in FIGS. 2, 14 and 15. Pivot words are used in translating between two languages, with each pivot word serving as a semantic datum. As described in relation to FIG. 14, the thesaurus associates each pivot word with superordinate pivot words, to which the pivot word is subordinate; whole pivot words, to which the pivot word is related as a part; and entirety pivot words, to which the pivot word is related as a component or element.

Published European Patent Application 168,814 describes a language processing dictionary which, as described in relation to FIGS. 3, 4, 8a and 8b, can be used in a pivot type machine translating system as a thesaurus. FIGS. 5, 6 and 7 show respectively how records are structured in a morphemic dictionary, a conceptional dictionary and a syntactic dictionary, all within the language processing dictionary.

It would be advantageous to have a thesaurus which more efficiently represents and retrieves synonyms.

SUMMARY OF THE INVENTION

The present invention provides techniques for efficient storage and retrieval of synonyms or the like. The compactly stored synonyms can be rapidly accessed to retrieve the synonyms of a given word. For example, the invention can be used to store thesaurus data more efficiently in a personal computer's resident memory, reducing disk-swapping and providing more rapid synonym retrieval.

One aspect of the present invention is based on the recognition that the information necessary for storage and retrieval of synonyms or the like includes two distinguishable parts and that distinguishing these parts makes possible a very efficient associating device. One part, referred to herein as relating information, is the information which relates each word to other words. The other part, referred to as identifying information, identifies each word, and each word may have a unique corresponding identifier. This aspect of the invention is based on the discovery that the relating information for a thesaurus or the like, which is equivalent to membership of each word in one or more groups of words, can be very efficiently included in a data structure by grouping identifiers of the words in accordance with the relating information. Association can then be performed by using an instance of a word to obtain that word's corresponding identifier; comparing the identifier to the grouped identifiers in the data structure; and, upon finding a group which includes a matching identifier, retrieving the identifiers in that group.

Another aspect of the invention is based on the further recognition that the space occupied by the relating information may be reduced by ordering the identifiers so that the relating information can be determined from the sequential positioning of the identifiers within the data structure. The relating information about each group includes the location of the identifiers of its members; its length or number of members; the part of speech of its members; and other features distinguishing it from other groups. This aspect is based on the discovery that the groups can be sorted so that all of this information for a given group can be determined from the sequential position of one of the identifiers in that group.

The relating information of a group member can be determined from the sequential position of its identifier, however, only if additional data is available for interpreting the position. Another closely related aspect of the invention is based on the recognition that this additional data is another source of space inefficiency. This problem can be solved by positioning the identifiers within the data structure so as to reduce the amount of additional data required. More specifically, the identifiers can be positioned so that the information about each group can be determined algorithmically from the sequential position of the identifier corresponding to one of its members together with a relatively small number of values from tables in the data structure.

This aspect of the invention can be implemented by sorting the groups according to group length, the length of a group being the number of identifiers in it. The sequential position of a given identifier and table values indicating the number of groups of each existing length are then used to determine the length of that identifier's group and the positions of its first and last identifiers. If this technique is used, data about the location and length of each group can be omitted. If each group corresponds to a group of related words such as synonyms, data about the part of speech of each group can similarly be omitted. In this case, the groups are similarly sorted by part of speech. The position of a given identifier in the sequence and table values indicating the positions of the first and last identifiers within each part of speech are then used to determine the part of speech of the group which includes the given identifier. The table values could, for example, be the position of the last identifier of each part of speech, which would also indicate the position in the sequence of the first identifier of the next part of speech.

Another aspect of the invention is based on the further recognition that each word identifier can be made very compact by identifying each word with a unique corresponding number from a dense set of numbers of fixed length. As a result, a relatively large number of words can be compactly represented in the data structure, each word being identified by a binary number with a relatively small number of bits. Groups which include a candidate word can be found by using the candidate word to obtain its corresponding number and scanning the data structure, comparing each identifier with the candidate word's corresponding number to find matches. Upon finding a match, the relating information can then be determined from the sequential position of the matching identifier, using the tables.

Combining these aspects of the invention yields a very compact data structure containing a sequence of numbers, each corresponding to a word, and the tables. But storing each number in an integral number of bytes may be inefficient, depending on the number of words represented. If so, the data structure may be made even more compact by storing each identifier in parts, at least one of which may be less than a full byte. If the full byte length is an integer multiple of the length of each part of an identifier, a comparison with each part can be made in a single machine cycle using shift and mask operations.

The process of scanning the numbers can be made more time efficient by sorting each group by number and by sorting groups of equal length by the first number in each group. Then, while scanning a group, if a number in the group exceeds the candidate word's number, the remaining numbers in that group can be skipped. Similarly, if the first number of a group exceeds the candidate word's number, all the remaining groups of that length can be skipped, because none of their numbers could match. These improvements in time efficiency do not require additional entries in the tables.

A data structure according to the invention may be be used in a thesaurus or other similar word associating device. A candidate word is compared with all the words in the sequence and, upon finding a match, the associated words are retrieved From the group containing the match. A thesaurus system according to this aspect of the invention thus includes the data structure; means for comparing the candidate word's corresponding number with the numbers in the data structure to obtain the location of a matching number; and means for determining information about the group which contains it based on the location of the matching number. The determined information may be the locations of the numbers in that group, so that the system may further include means for retrieving those numbers. The thesaurus also includes means for receiving and mapping the candidate word to its corresponding number and means for mapping the retrieved numbers back to words which can be provided to the user.

These and other objects, features and advantages will become more apparent from the following description, together with the attached drawings and the appended claims.

DETAILED DESCRIPTION

A. General Description

The term "thesaurus" often refers to a book of synonyms. A thesaurus thus enables a user to find synonyms of a given word. But, as in the above discussion, the term "thesaurus" is also used to refer to a function performed by an electronic device, such as a computer, which similarly provides synonyms of a given word to the user. In this latter sense, a thesaurus is but one example of a larger class of associating devices which, in response to any of a number of tokens, provides related tokens. A translator is another example of an associating device applicable to words, but such an associating device could also be used for types other than words, provided that the associating device has information associating each of a number of acceptable types with related acceptable types and provided that each token to be associated is an instance of one of the acceptable types.

The terms "token" and "type" are used herein in accordance with their usual meanings in linguistics. A token is thus a particular instance of an expression, symbol or sentence, while a type is the general form of the expression, symbol or sentence as contrasted with its particular instances. While the term "word", as used herein, refers to a type, the terms "instance of a word", "input word", "received word", "output word", "stored word" and the like refer to tokens.

Although the invention is generally described below in terms of words, it is equally applicable to other types and their tokens. For example, the invention could be applied to ideographic symbols or symbols of any other kind, individually or in strings. It could also be applied to strings of words, including phrases and clauses.

Figure 1:
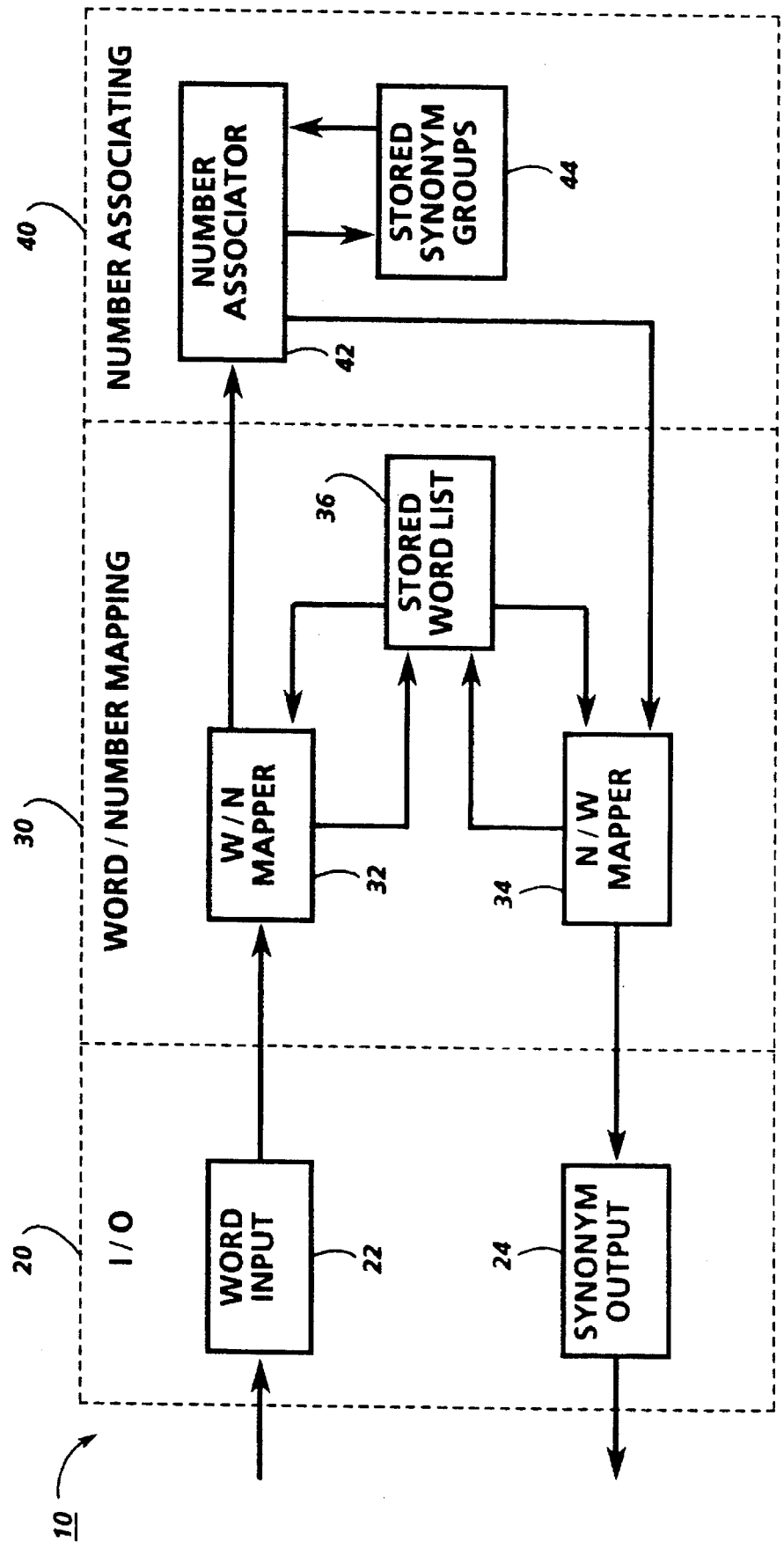
FIG. 1 is a schematic block diagram showing the major functional components of a thesaurus according to the invention.
Figures 2, 3:
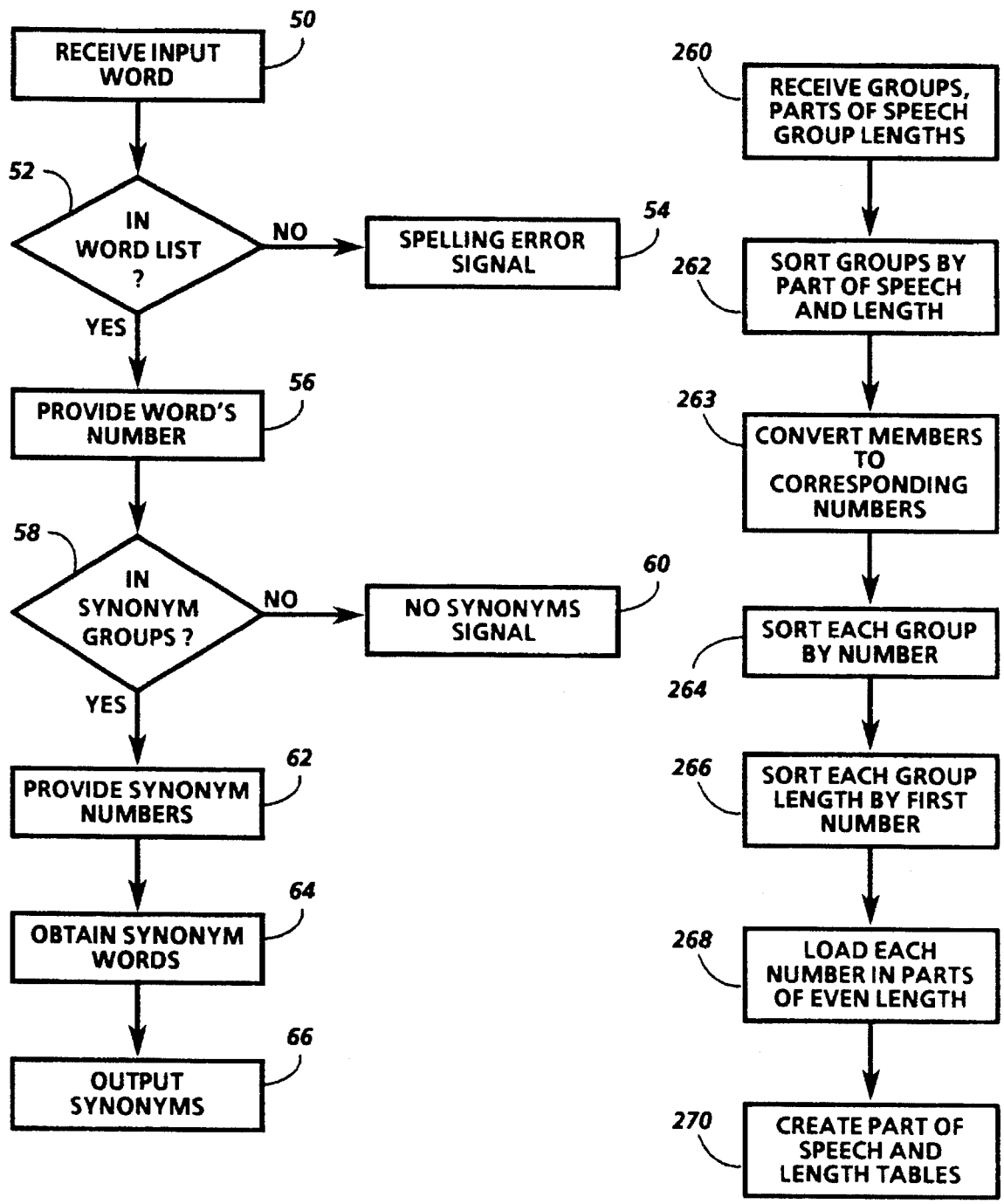
FIG. 2 is a flowchart showing a sequence of basic functions in the use of a thesaurus according to the invention.
FIG. 3 is a flowchart showing a method of creating a data structure including a list of groups of synonyms and a table according to the invention.

FIG. 1 illustrates an associating device according to the invention which provides synonyms in response to an input word. FIG. 2 is a flowchart showing how an input word's synonyms may be retrieved according to the invention.

Device 10 in FIG. I has three broad functional parts. I/O part 20 performs the input and output (I/O) functions. Specifically, word input 22 receives an input word from the user, and synonym output 24 provides the synonyms of that word to the user. I/O part 20 also provides the input words it receives in an appropriate digital form to word/number mapping part 30, and similarly receives the synonymous words output from mapping part 30. Mapping part 30 includes a word to number (W/N) mapper 32 and a number to word (N/W) mapper 34, each of which accesses stored word list 36. Number associating part 40 receives the output of mapper 32 and provides the input of mapper 34. Within it, number associator 42 receives an input number representing the input word from W/N mapper 32 and provides to N/W mapper 34 the output numbers representing that word's synonyms. Number associator 42 accesses stored synonym groups 44 to associate synonyms with the input word.

FIG. 2 shows the operation of device 10 in more detail. In box 50 an input word is received by word input 22 and provided to W/N mapper 32. In box 52, W/N mapper 32 accesses stored word list 36 to determine whether the input word is one of the acceptable words which word list 36 is capable of mapping. If not, a spelling error signal is provided in box 54 through conventional signaling means (not shown). But if the word is in stored word list 36, W/N mapper 32 obtains the corresponding number and provides it to number associator 42, in box 56. Number associator 42 similarly compares the input word's corresponding number with the numbers in synonym groups 44, looking for a match, in box 58. If the corresponding number does not match any of the grouped numbers, a no synonyms signal is provided in box 60, again through conventional signaling means (not shown). But if one or more matches occur, number associator 42 retrieves the numbers corresponding to the synonymous words from synonym groups 44 and provides them to N/W mapper 34, in box 62. N/W mapper 34 accesses stored word list 36 to obtain synonymous words corresponding to the retrieved numbers, in box 64. The synonymous words are then provided through synonym output 24 in box 66.

One aspect of the invention illustrated in FIGS. 1 and 2 is the combination of using a received token such as an input word to obtain an identifier such as a corresponding number and then using the number to retrieve the identifiers of types related to the type of the received token from stored groups of identifiers. The retrieved identifiers may then be used to obtain corresponding tokens. As discussed above, this combination of features makes possible a very efficient associating device. The manner in which these features can be efficiently implemented is discussed in greater detail below.

The structure of device 10 includes three major parts which perform independent functions and therefore can be highly specialized for efficient operation. For example, stored word list 36 may contain a directed graph with skippable branches for very efficient W/N and N/W mapping, as described in copending coassigned U.S. patent application Ser. No. 07/054,462, continued as U.S. Ser. No. 07/563,885, which was in turn continued as U.S. Ser. No. 07/776,909, entitled "Word/Number and Number/Word Mapping" ("the mapping application"), which is incorporated herein by reference. Similarly, synonym groups 44 may contain a compact series of uniform length numbers from a dense set of numbers, each number corresponding uniquely to a word. For further compactness, each number may be stored in parts, at least one of which may be less than a full byte in length. The full byte length is an integral multiple of the length of each part, permitting comparison of each part in a single machine cycle.

Because the mapping and associating functions are independent, the interfaces between the major parts may also be specialized for the types of data handled, since only words cross the interface between I/O part 20 and word/number mapping part 30, while only numbers cross the interface between word/number mapping part 30 and number associating part 40. Therefore, device 10 may be realized in many ways, depending on the speed and space efficiency which must be achieved and on the available components.

The components of I/O part 20 of device 10 in FIG. 1 may be any available components capable of providing the necessary input and output functions. For example, word input 22 may be a conventional keyboard, and synonym output 24 may be a conventional display. Both word input 22 and synonym output 24 may be handled through a conventional display-based user interface. Other I/O devices could be used within the scope of the invention, including speech or character recognition circuitry and speech generation circuitry.

Word/number mapping part 30 could be implemented with any components which perform the necessary mapping of words to numbers and back. Stored word list 36 will be especially compact if created in accordance with the technique described in the mapping application, incorporated herein by reference. In addition, W/N mapper 32 and N/W mapper 34 may efficiently be implemented as software routines executed by a data processing system in accordance with the techniques described in the mapping application, as discussed in more detail below.

Number associating part 40 could similarly be implemented with any components which retrieve numbers related to an received number. As described above, it receives a number corresponding to an input word from word/number mapping part 30 and, in turn, provides the retrieved numbers of related words to word/number mapping part 30. In addition, number associating part 40 can provide information about the part of speech of each retrieved number, to assist a user in identifying the relevant synonyms. A number of additional aspects of the present invention relating to the implementation of number associating part 40 are described below in relation to its components.

We turn now to consider the structure of stored synonym groups 44 and how number associator 42 retrieves synonyms and additional information using stored synonym groups 44.

B. Stored Groups

Relating information about groups of related types such as synonyms can be stored in various ways. For example, identifiers of the types can be stored in groups, each group containing data such as its length, location of its members and the relevant part of speech. Upon receiving a number corresponding to an input word, number associating part 40 could simply retrieve the stored numbers from all the groups containing that number, together with their parts of speech. The groups could be identified by searching for the received number or by retrieving a list identifying the groups which include the received number.

Stored synonym groups 44, in accordance with the invention, have a number of features promoting efficiency. For compactness, the part of synonym groups 44 whose contents are compared includes only the numbers, with the relating information being determinable from the sequence of the numbers using compact tables. For further compactness, each number is stored in a number of parts, each of which has a length permitting single cycle access and comparison. For rapid scanning, the numbers in each group are sorted and the groups within each part of speech are sorted by first number, permitting the skipping of the remaining numbers in a group or the remaining groups in a part of speech.

Figure 4:
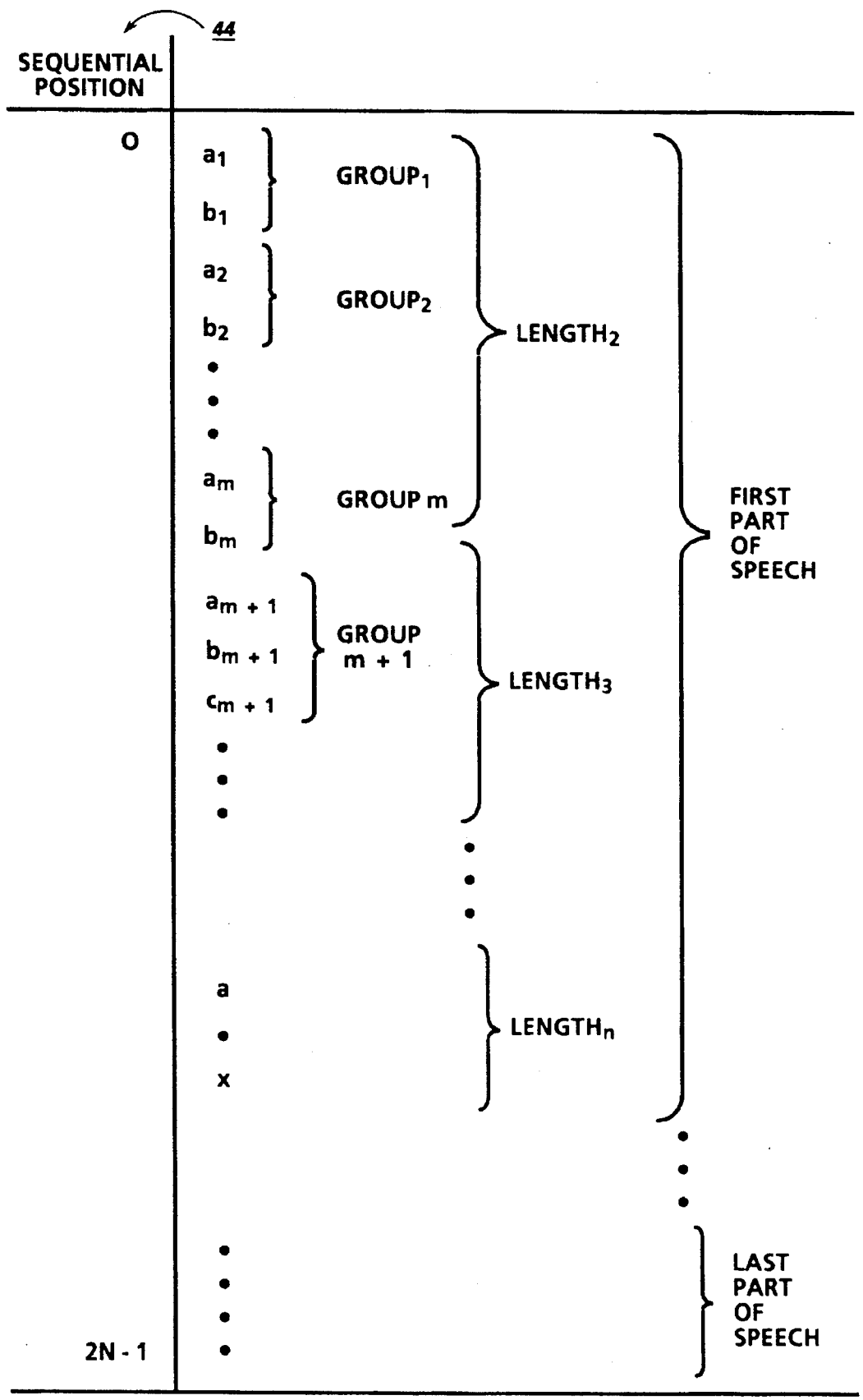
FIG. 4 is a schematic diagram of a data structure created according to the method of FIG. 3.

Synonym groups 44 can thus be stored in a compact form which permits rapid scanning. FIG. 3 illustrates a technique for storing synonym groups 44 according to the invention. FIG. 4 illustrates the resulting data structure.

The technique of FIG. 3 begins in box 260 by receiving the groups in a conventional form, in which each group ordinarily includes data identifying each member of that group and data explicitly indicating that group's length and part of speech. Many of the groups will have relatively few members, so that this additional data about each group's length and part of speech is a substantial part of the group. In order to eliminate this additional data, a sort is performed in box 262 which orders the groups into a sequence so that this information can be determined from the sequential position of any of the members of a group. This sort orders the groups according to part of speech and, within each part of speech, by group length.

When the groups have been sorted, the information identifying each group member is converted in box 263 into a compact identifier such as a number from a dense set of numbers. Even after this conversion is completed, however, it is necessary to keep the numbers in groups with additional data, to permit subsequent sorting and preparation of tables.

Additional sorts are performed to permit skipping of some of the members or some of the groups during searching. In box 264, each group is sorted numerically, so that the smallest number is first. Then, in box 266, the groups are sorted numerically according to the first number in each group. As a result, if the candidate number being compared is smaller than a number, it is also smaller than the subsequent numbers in the same group, and they can be skipped. And if the candidate number is smaller than the first number in a group, then it is smaller than all the subsequent numbers in all of the subsequent groups of that length for that part of speech, so that those groups can be skipped. These additional sorts facilitate faster searching.

When the numbers in each group and the groups themselves have been sorted in this manner, they are loaded in sequence into a data structure, in box 268. During this step, each group is taken in turn and tested to determine whether it has the same part of speech and length as the previous group. If it is a different part of speech, the sequential position of the last number of the previous group is temporarily stored for subsequent use in creating tables. Similarly, if it has a different length, the number of groups having the previous length is temporarily stored for use in table creation. Then the numbers in the group are loaded in sequence beginning at the next location in the data structure.

The manner in which each number is loaded depends somewhat on the total number N of numbers in the synonym groups. A typical thesaurus, for example, may contain a total of 31,000 stored numbers, but only about half that many, or slightly less than $2^{14}$, unique numbers. To permit rapid comparison, each stored number could be loaded as two full bytes of eight bits each, so that each byte can be retrieved and compared with the corresponding byte of a number from W/N mapper 32 in a minimal number of machine cycles.

For greater compactness each number could instead be divided into three parts, respectively eight bits, four bits and two bits in length, with the parts of each length being loaded in a respective array in the same overall sequence. Another technique is to load only the first number of each group in full and, for each subsequent number, to load only the difference between it and the previous number, which should ordinarily reduce the parts loaded for each number to two—one of eight bits and one of four bits, each in a respective array. Because the full byte length is an integral multiple of the length of each part in these techniques, the part lengths may be referred to as "even lengths". These techniques would eliminate two or four of every 16 bits in the synonym groups, although they also require one or two extra comparisons in some cases.

In either of these techniques, the arrays are loaded so that the addresses or array indexes of the parts of each stored number bear a given relationship to each other to facilitate retrieval. The full length array index could be shifted, for example, to obtain the shorter length array indexes, with bits of the index being masked to indicate which bits of the array entry at that index should be used for comparison. Using even lengths thus permits single cycle comparison, using a shift operation to find the appropriate part and a mask operation to compare it with the corresponding part of a received number. The starting point or base of each array would be stored for use in accessing that array.

FIG. 4 shows the sequence of the numbers in the data structure in synonym groups 44. At the highest level of organization, the groups are ordered by part of speech, from the first to the last part of speech. Within each part of speech, the groups are ordered by length, with no group being less than two numbers, so that the lengths range from $Length_2$ to $Length_n$, where n is the longest length of any group. Within each length, the groups are ordered by their respective first numbers. For example, in $Length_2$, $a_1$ of $Group_1$ is smaller than $a_2$ of $Group_2$, and so forth through $a_m$ of $Group_m$. Similarly, $a_{m+1}$ is the smallest of the first numbers of $Length_3$. Finally, the numbers within each group are in order, so that number a is smaller than number b, which is in turn smaller than number c, and so forth.

Finally, when the numbers have all been loaded in the data structure, and the information for creating the tables has also been temporarily stored, the tables are created, in box 270. Two tables can be created, for example, a part of speech location table and a group length table. The location table includes an ending location (Part End) for each part of speech, indicating the sequential positions of the last number of that part and of the first number of the next part. The group length table could include, for each part of speech, M values each indicating a number of groups (GroupNo) within that part of speech which have a given length. But if the lengths are sparse, each entry of the length table should include a length and a number of groups (GroupNo). The bases of both tables are stored for use in accessing them during associating.

The table contents are based on the previously stored information. As noted, the part end for each part of speech is the sequential position of the last number in the last group having that part of speech. The GroupNo of each length within a part is, of course, the number of groups of that length within that part of speech.

The use of stored synonym groups 44 as shown in FIG. 4 can be better understood from the technique used to associate synonyms. We turn now to the operation of number associator 42.

C. Association

Figure 5:
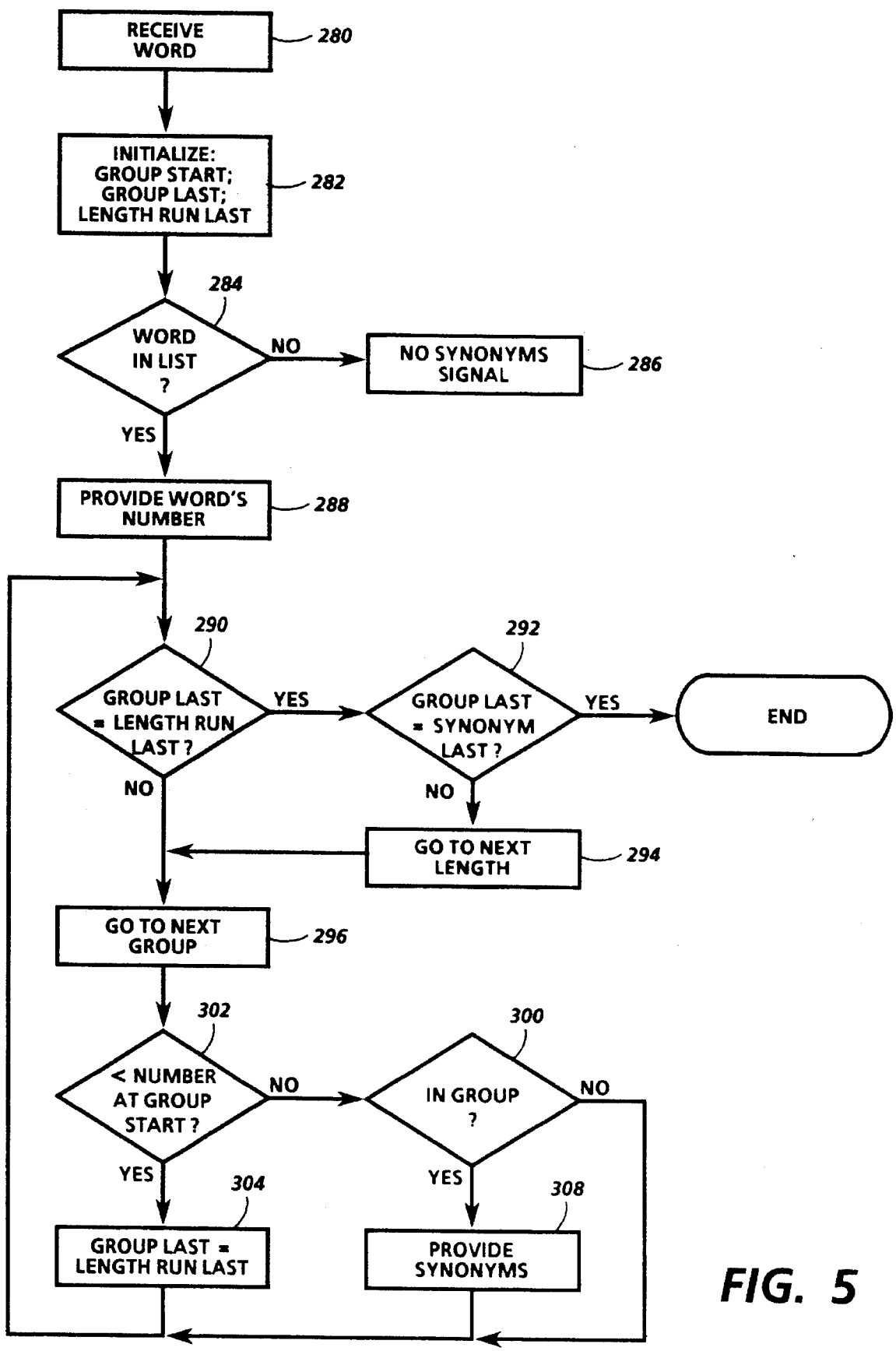
FIG. 5 is a flowchart showing a synonym retrieval routine including number to number association according to the invention.

The manner in which number associator 42 operates depends primarily on the manner in which data about related words is stored. FIG. 5 shows a synonym retrieval routine which includes steps for associating numbers using stored synonym groups 44 in FIG. 4. Other techniques would be appropriate, of course, if the synonyms were stored in other arrangements.

The routine of FIG. 5 begins when a word is received, in box 280. Before proceeding with mapping and associating, the step in box 282 initializes a number of variables, including GroupStart, the first location of the current group; GroupLast, the last location of the current group; LengthRunLast, the last location of the last group of the current group length; and others, such as SynonymLast, the last location in the synonym groups. For the routine of FIG. 5, it is convenient to initialize GroupLast and LengthRunLast to −1.

The stored word list used for the routine of FIG. 5 contains only those words which have synonyms in the stored synonym groups. Therefore, the test in box 284 determines not only whether the word received in box 280 is in the word list but also whether it is in the synonym groups, performing both the tests in boxes 52 and 58 in FIG. 2. If not, a no synonyms signal is provided in box 186, but if so, word's number is provided in box 288 as described above. This completes the operation of W/N mapper 32, and the operation of number associator 42 begins.

The test in box 290 determines whether the current value of GroupLast is equal to the current value of LengthRunLast. This will occur if the two variables are initialized to be equal, and also when the current group is the last group of this length. In either case, the test in box 292 then determines whether GroupLast is equal to SynonymLast, which would mean that all the stored synonym groups have been compared and the routine can end. If not, the routine goes to the next group length, meaning that the group length table is accessed to obtain the next length and the number of groups of that length. Those values are then used to determine the new value of LengthRunLast and other variables relating to the new group length, in box 294.

After the routine proceeds to a new group length, if necessary, the step in box 296 goes to the next group, which can be done by changing relevant variables, including setting GroupStart to one greater than GroupLast and increasing GroupLast by the current group length. Before the routine actually compares the received word's corresponding number to the members of the current group, the test in box 302 determines whether that number is less than the number at GroupStart. If so, the received word's number is less than all of the members of this group and of all the succeeding groups of the same length. Therefore, GroupLast is set to LengthRunLast in box 304 to ensure that the routine will go to the next group length.

Finally, the test in box 306 determines whether the received word's number matches any of the members of the current group. If not, the routine returns to the test in box 290, but if so, the synonyms of the received word are provided in box 308. The steps in boxes 306 and 308 are described in more detail below in relation to FIG. 6, and it will be seen that they include operations of N/W mapper 34 as well as number associator 42.

The routine of FIG. 5 could be modified to permit the user to specify a part of speech as well as a word. If it were so modified, steps would be added to confine number association to the portion of the stored synonym groups for the selected part of speech. For example, SynonymLast could be set to the last location of that part of speech, based on the part of speech table, and GroupStart could be initialized to the first location of that part of speech.

Figure 6:
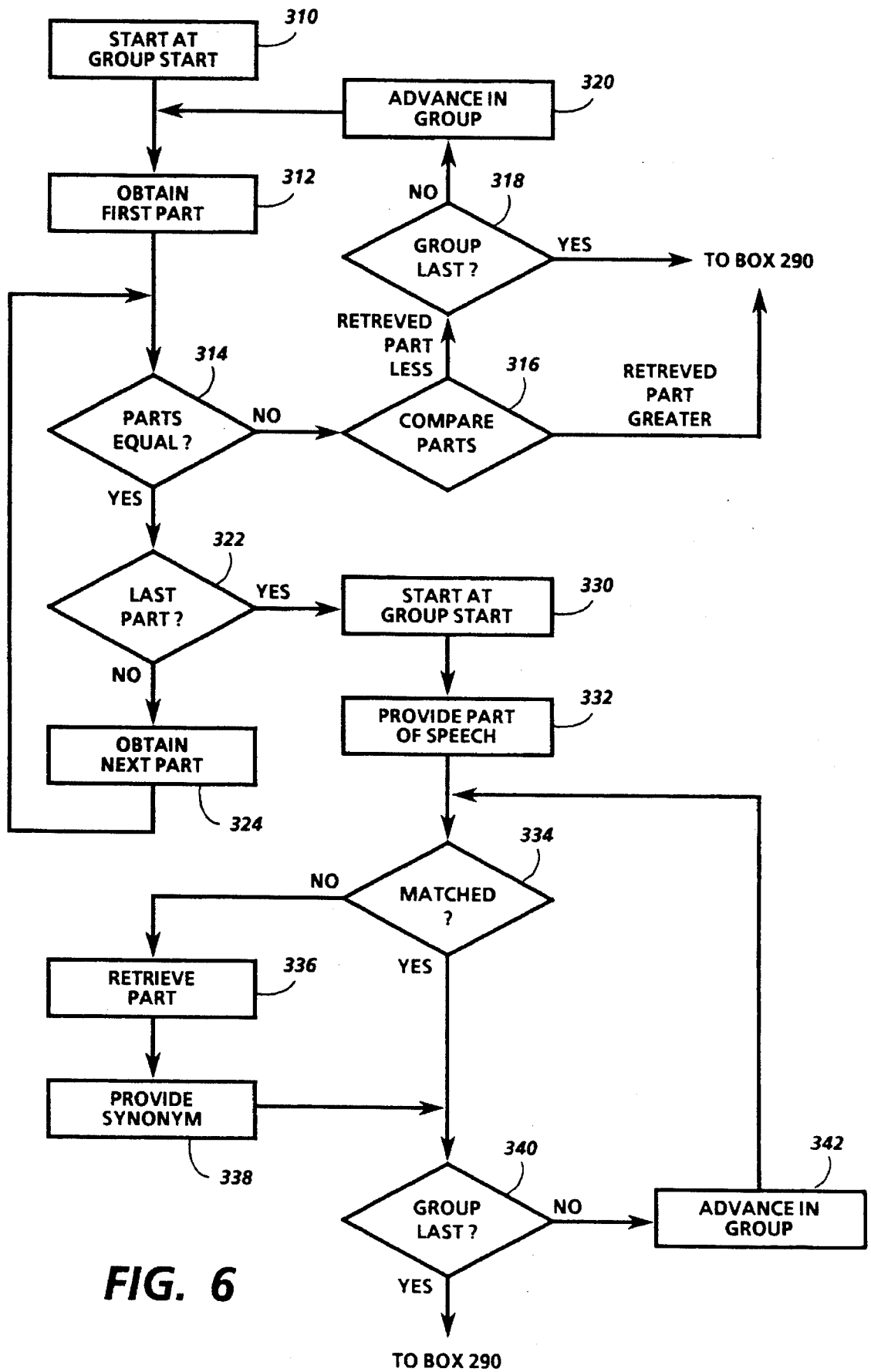
FIG. 6 is a flowchart showing in more detail some of the steps of FIG. 5.

FIG. 6 shows in more detail how steps 306 and 308 in FIG. 5 may be implemented. In general, the subroutine of FIG. 6 is appropriate where each number is loaded in the data structure in two or more parts, as described above in relation to FIG. 3.

The steps corresponding to box 306 begin with the step in box 310, in which the subroutine starts with the location GroupStart. The first part of the value at that location is retrieved in box 312. Then, in box 314, the retrieved part is compared with the corresponding part of the received word's number. If the two are not equal, it is not necessary to retrieve any of the other parts, but the corresponding part of the received word's number is compared with the retrieved part in box 316 to determine which is greater. If the retrieved part is greater, a match can no longer occur, so that the subroutine returns to box 290. If the retrieved part is less, and if the group has more members, a match could still occur, so that the test in box 318 next determines whether the subroutine has reached GroupLast. If so, the subroutine returns to box 290 in FIG. 5, ending the steps corresponding to box 306. Otherwise, the subroutine advances to the next member of the current group in box 320 and obtains its first part in box 312.

If the test in box 314 finds equality, the test in box 322 determines whether the current part is the last part of the numbers being compared. If not, the next part is retrieved in box 324, modifying the location being accessed as necessary to retrieve the next part. Then the test in box 314 is repeated.

When the test in box 322 indicates that the last part has been successfully compared, a match has been detected, and the test in box 306 in FIG. 5 is completed. The subroutine then proceeds to provide the synonyms from the current group, as in box 308. To do so, the subroutine again starts at GroupStart, in box 330. Based on the value at GroupStart, the step in box 332 determines the part of speech of the current group and provides it to be displayed. The test in box 334 determines whether this is the member of the group which matched the received word's number, which can be done by keeping a value representing the position of the matching member. If not, the parts of the member are retrieved in box 336, and N/W mapper 34 provides the corresponding synonym in box 338.

The test in box 340 then determines whether this member is at GroupLast, in which case the subroutine returns to the test in box 290 in FIG. 5. Otherwise, additional members of the group remain to be examined. The subroutine advances to the next member of the group in box 342 before returning to the test in box 334.

One timesaving variation of the routine in FIGS. 5 and 6 would be to search stored synonym groups 44 in reverse order if the received number were greater than some predetermined value. Searching in reverse order is faster for high received numbers because a large number of groups whose members would be less than the received number could be skipped.

Another approach would be to divide the range of numbers into subranges at certain break values, dividing the groups into subgroups each containing the numbers in that group which fall in one of the subranges. The received number is compared with the break values to determine which set of subgroups should be searched. This reduces space because each number can be stored as an offset from the next lower break value. This space saving is partially offset, however, by an additional subgroup length table for each additional subgroup. If the numbers are stored in disk memory or other low speed storage, this technique makes it possible to confine the search to a part of the stored numbers. As a result the total number of data to be moved into high speed memory during search can be reduced, which can be advantageous.

Other techniques could also be used to adjust the speed of number associator 42. For example, a table could be used to obtain the starting location of each group containing a given input word. Or some data could be included in a group indicating the next group with any of the same members, so that if a matching number were found, the search could omit a number of subsequent groups.

To provide the synonyms in each group in alphabetical order, stored word list 36 can be created so that the numerical order of the numbers corresponds to alphabetical order. This can be done by ordering the outgoing transitions of each state in alphabetical order during creation of the word list in accordance with the mapping application.

The above implementation of number associator 42 thus receives a number from W/N mapper 32 and provides the numbers in all the groups which include that received number to N/W mapper 34. We turn now to a thesaurus system making use of the routines described above in relation to FIGS. 5 and 6.

D. Thesaurus System

A thesaurus could be implemented in a number of ways within the scope of the invention. For example, the routines described above and the data necessary for their execution could be stored in the memory of a data processing system.

Figure 7:
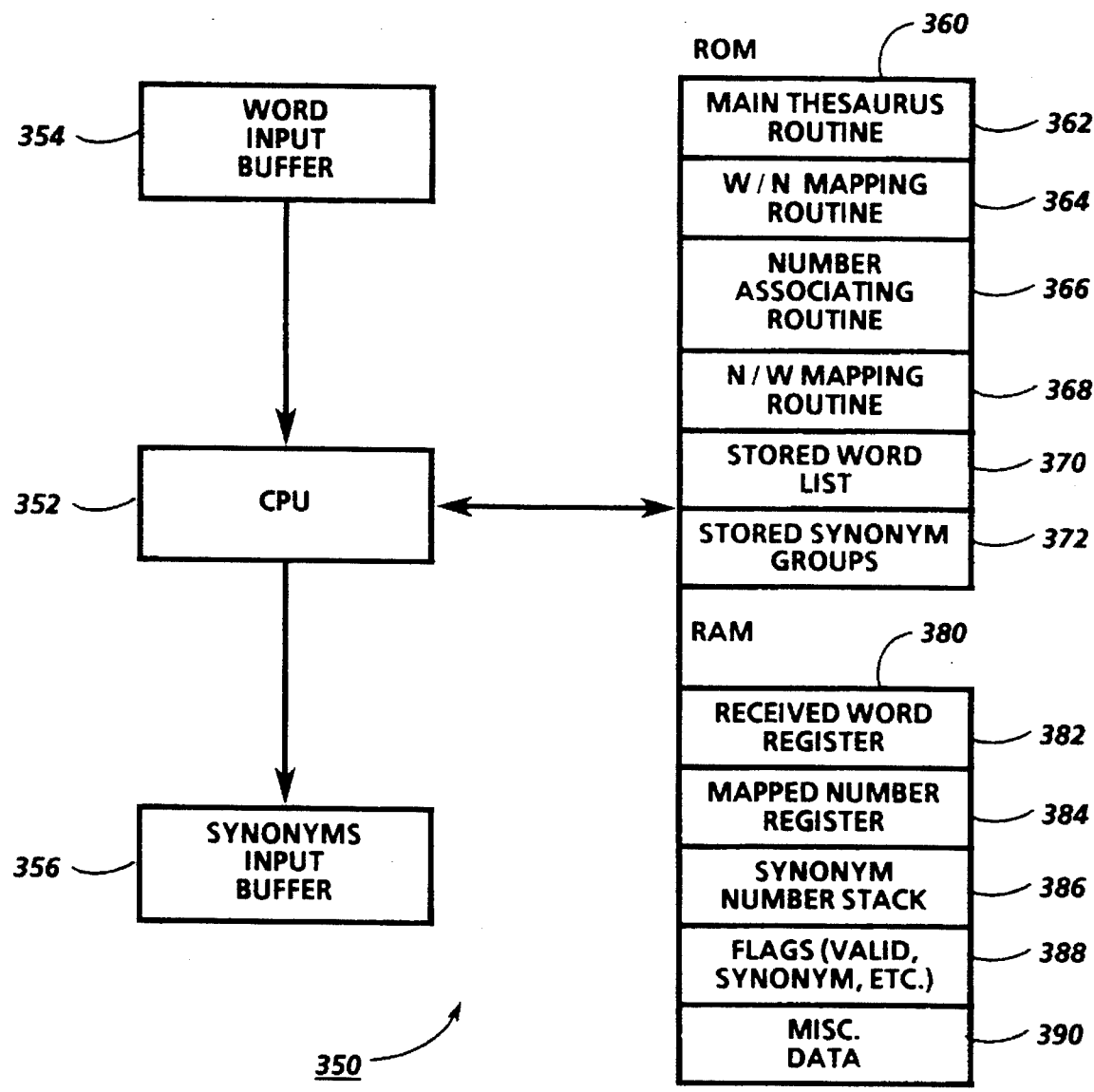
FIG. 7 is a schematic diagram of a data processing system for thesaurus operations according to the invention.

FIG. 7 shows such a thesaurus system 350 with CPU 352. An input word goes to CPU 352 through word input buffer 354, and the resulting synonyms and additional information, such as part of speech, are output through synonyms output buffer 356. During operation, CPU 352 executes routines stored in ROM 360, relevant ones of which are shown.

As CPU 352 executes main thesaurus routine 362, it calls a number of other routines, including W/N mapping routine 364, number associating routine 366, and N/W mapping routine 368, as discussed below in relation to FIG. 8. W/N mapping routine 364 and N/W mapping routine 368 access stored word list 370, while number associating routine 366 accesses stored synonym groups 372. These routines also store data temporarily in RAM 380.

Within RAM 380, received word register 382 stores the input word pending subsequent operations. Mapped number register 384 stores the number to which the input word is mapped. Synonym number stack 386 holds the retrieved numbers from the synonym groups which contain the input word.

A number of flags are provided, such as the synonym flag discussed above and a valid word flag which indicates whether the input word is in stored word list 370. Miscellaneous data 390 is temporarily stored in RAM 380 during the execution of the various routines, including, for example, a LIFO stack used in N/W mapping in accordance with the mapping application.

Figure 8:
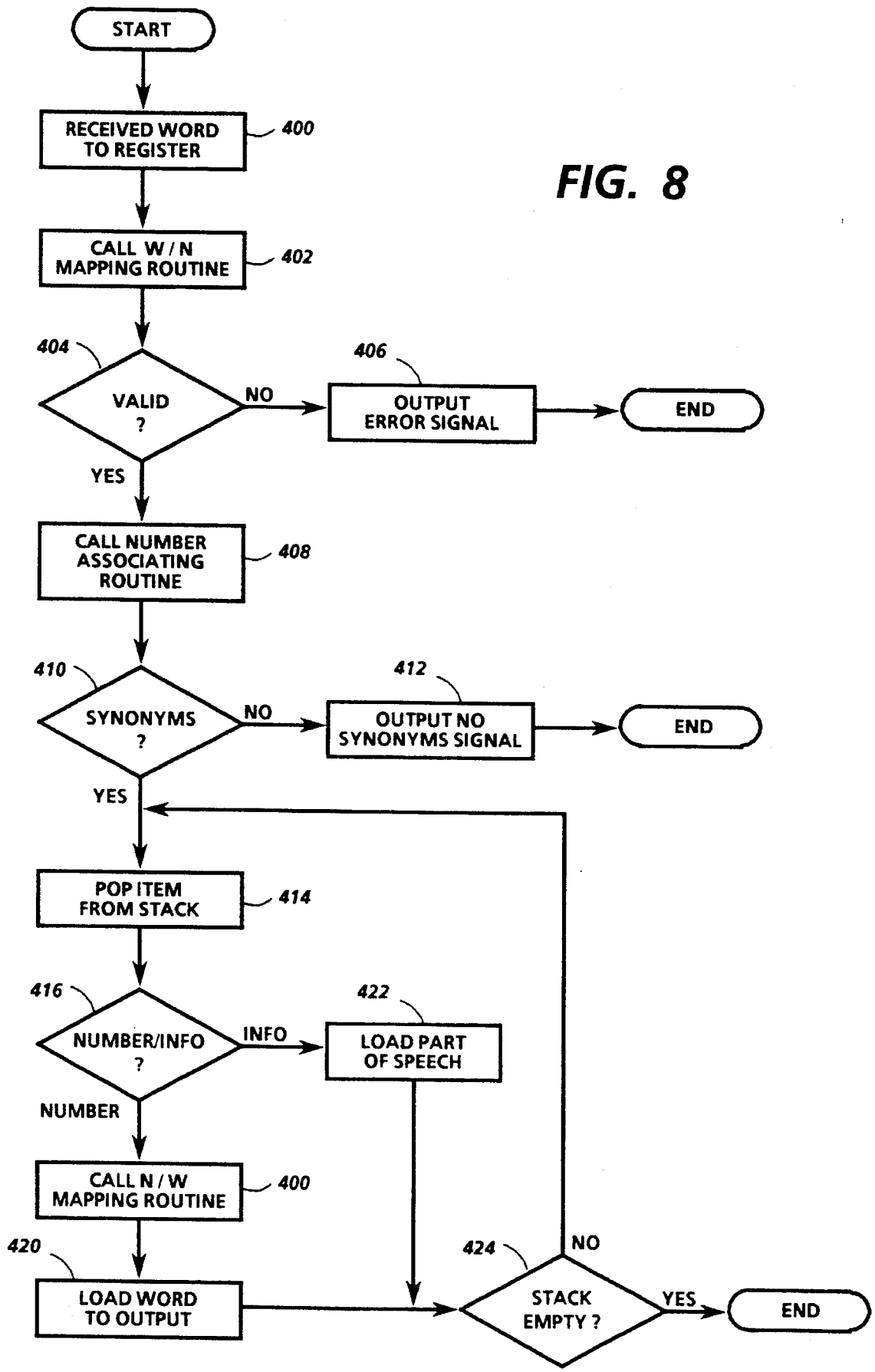
FIG. 8 is a flowchart showing the main thesaurus routine of the system of FIG. 7.

FIG. 8 shows an implementation of main thesaurus routine 362 which generally follows the steps in FIG. 2. The routine begins in box 400 by transferring an input word from word input buffer 354 to received word register 380. Then, in box 402, W/N mapping routine 364, which can be implemented according to the mapping application, is called to map the input word to an input number, which is stored in mapped number register 384. W/N mapping routine 364 may also return a signal indicating a mapping failure, in which case the valid flag in flags 388 is cleared. In box 404, the routine tests the valid flag. If it has been cleared, an error signal is loaded into output buffer 356 in box 406 and the routine ends.

If the input word is successfully mapped, number associating routine 366 is called in box 408. Number associating routine 366 will set the synonym flag if synonyms are found.

Number associating routine 366 also loads the synonym number stack 386, and includes in it information about each group, such as part of speech information. Synonym number stack 386 may, for example, be a FIFO stack. Instead of following the steps in FIG. 2, main thesaurus routine 362 could optionally follow the steps described above in relation to FIGS. 5 and 6, in which case number associating routine 366 would not set a flag, and the members of a group would be provided when a match with one of them was found.

When number associating is complete, the test in box 410 determines whether the synonym flag is set. If not, the routine loads a no synonyms signal to output buffer 356 in box 412 and ends. But if synonyms have been found, the routine begins to unload the stack to provide the synonyms themselves as output.

Each item in turn is popped from the stack in box 414. The test in box 416 then determines whether the popped item is one of the retrieved numbers or is information about a group. If a number, N/W mapping routine 368, which can be implemented according to the mapping application, is called in box 418. The output word which it provides is loaded to output buffer 356 in box 420. If group information is in the item popped from the stack, the corresponding part of speech and other appropriate information are loaded to output buffer 356 in box 422. The test in box 424 then determines whether the stack is empty, and, if not, another item is popped in box 414. When the stack is empty, the routine ends.

Main thesaurus routine 362 could be implemented in a number of other ways. For example, to limit the amount of temporarily stored information, N/W word mapping could be performed each time a number is retrieved from the synonym groups. In addition, the groups should be arranged within stored synonym groups 372 to minimize disk swapping during scanning. The best technique for doing so depends on the capacity of resident memory and on other features of the system.

E. Miscellaneous

The invention has been described with reference to a thesaurus, but has a number of other applications. For example, the invention may be applied to word association problems of various kinds. A translation capability could be provided, with the user typing in an input word in one of a number of languages and the device responding with a number of groups of output words, each including the input word and synonymous words of other languages. For applications involving a highly inflected language, the inflected forms of a root word could be grouped with the root to permit retrieval of all the other forms in response to any one of the forms.

Many other modifications and variations of the invention will be apparent to one skilled in the art from the above description, the drawings and the claims. The scope of the invention is therefore not limited by the above description, but only by the attached claims.

What is claimed:

1. A computer-implemented method of using a data structure stored in computer-accessible memory that includes two or more groups of identifiers of types; each group of identifiers identifying a respective group of types; each group of identifiers including, for each type in the respective group of types, a single identifier identifying the type; the identifiers in the groups each having a respective position in a sequence of identifiers so that all of the identifiers of each group can be retrieved based on the respective position of any of the identifiers in the group; the method comprising computer-implemented steps of:

using a first token of a respective one of the types to obtain an identifier of the first token's respective type;

accessing the data structure to compare the identifier of the first token's respective type with the identifiers in the data structure;

when the accessing step finds one of the grouped identifiers which matches the identifier of the first token's respective type, retrieving other identifiers in the same group as the matching grouped identifier based on the respective position of the matching grouped identifier.

2. The method of claim 1, further comprising a step of using each retrieved identifier from the same group as the matching grouped identifier to obtain a respective token of the type identified by the retrieved identifier.

3. The method of claim 2 in which the first token is an instance of a first word, each identifier identifying a respective word, each group of identifiers identifying a group of synonymous words, the step of using each retrieved identifier comprising using each retrieved identifier to obtain an instance of its respective word to provide synonyms of the first word.

4. The method of claim 3 in which the step of using the first token comprises a substep of determining whether the first word is an acceptable word.

5. The method of claim 3, further comprising, if the accessing step does not find that any of the grouped identifiers matches the first word's identifier, a step of providing a signal indicating no synonyms of the first word.

6. The method of claim 1 in which each identifier is one of a dense set of numbers, the step of using the first token comprising a substep of using the first token to obtain one of the numbers which identifies the first token's respective type.

7. The method of claim 6 in which the identifiers in each group are sorted numerically, the step of accessing the data structure comprising a substep of comparing the identifier of the first token's respective type with one of the identifiers in a first one of the groups and determining whether to skip the remaining identifiers in the first group based on the comparison.

8. The method of claim 7 in which the groups are sorted numerically by each group's first identifier, the step of accessing the data structure further comprising a substep of comparing the identifier of the first token's respective type with the first identifier in the first group and determining whether to skip following groups based on the comparison.

9. A computer-readable memory for use in a system that includes a processor that can access data stored by the memory; the memory being encoded with a data structure; the data structure comprising:

two or more identifiers, each identifier having a value that identifies one of a set of types, each identifier having a respective position in a sequence in the data structure, each identifier identifying a respective one of the types so that the processor can access the data structure with a candidate identifier identifying one of the set of types to compare the candidate identifier with the identifiers in the data structure; each identifier being in one of a set of two or more groups of identifiers, each group identifying a respective group of the types; each group of identifiers including, for each type in the respective group of types, a single identifier identifying the type; the identifiers being ordered in the sequence so that the processor can determine the respective positions in the sequence of all of the identifiers of each group from the respective position in the sequence of any of the identifiers in that group that matches the candidate identifier.

10. The computer-readable memory of claim 9, in which the groups of identifiers are ordered within the sequence; a subset of the set of groups of identifiers being ordered according to the number of identifiers in each group.

11. The computer-readable memory of claim 10 in which each identifier is a number, a number of groups in the subset of groups of identifiers having the same number of identifiers, the identifiers in each group being ordered numerically so that each group has a first identifier; the groups having the same number of identifiers being ordered numerically according to the first identifier in each group.

12. The computer-readable memory of claim 11 in which each identifier has two or more parts, at least one part of each identifier having a length less than a full byte length, the full byte length being an integral multiple of each part's length so that a comparison with any of the parts can be made in a single machine cycle.

13. The computer-readable memory of claim 9 in which the respective type of each identifier is a word, the identifiers being ordered in the sequence so that the identifiers in each group of identifiers are together; each group of identifiers including identifiers identifying a group of words that have a respective part of speech, the groups of identifiers being ordered by part of speech.

14. The computer-readable memory of claim 13 in which the words in each group of words are synonyms.

15. A system comprising:

a data structure stored in memory;

instruction data stored in memory; and a processor connected for accessing the data structure and the instruction data stored in memory;

the data structure comprising two or more identifiers, each identifier having a value that identifies one of a set of types, each identifier having a respective position in a sequence in the data structure, each identifier identifying a respective one of the types so that the processor can access the data structure with a candidate identifier identifying one of the set of types to compare the candidate identifier with the identifiers in the data structure; each identifier being in one of two or more groups of identifiers, each group identifying a respective group of the types; each group of identifiers including, for each type in the respective group of types, a single identifier identifying the type; the identifiers being ordered in the sequence so that the processor can determine the respective positions in the sequence of all of the identifiers of each group from the respective position in the sequence of any of the identifiers in that group that matches the candidate identifier;

the instruction data indicating instructions the processor can execute; the processor, in executing the instructions:

obtaining a candidate identifier identifying one of the types;

accessing the data structure to compare the candidate identifier with the identifiers in the data structure; and determining the respective positions of the identifiers in one of the groups which includes an identifier that matches the candidate identifier, the processor determining the respective positions of the identifiers based on the respective position in the sequence of the matching identifier.

16. The system of claim 15 in which the processor further, in executing the instructions:
receives an input token; and
uses the input token to obtain the candidate identifier.

17. The system of claim 16 in which the processor further, in executing the instructions:
retrieves the identifiers in the group of identifiers that includes the matching identifier using their respective positions in the sequence; and
uses the retrieved identifiers to obtain output tokens.

18. The system of claim 17 in which the input token and each output token are each an instance of one of a set of words, each identifier being a number; the processor, in using the input token to obtain the candidate identifier, accessing a stored word list to map the input token to the candidate identifier; the processor, in using the retrieved identifiers to obtain output tokens, accessing the stored word list to map each retrieved identifier to one of the output tokens.

19. The system of claim 18 in which the processor operates, in accessing the stored word list, so that the identifiers identifying the set of words form a dense set of numbers.

20. The system of claim 17 in which the input token and each output token are each an instance of a word, the respective types of the identifiers in each group being synonyms, the processor receiving the input token from a user, the processor further, in executing the instructions:
providing the output tokens to the user as synonyms of the input token.

21. The system of claim 15 in which each identifier has two or more parts, at least one part of each identifier having a length less than a full byte length, the full byte length being an integral multiple of each part's length, the processor performing a comparison of each part in a single cycle.

22. A computer-implemented method of using a data structure stored in computer-accessible memory that includes two or more identifiers, each identifier uniquely identifying a respective word, each identifier being in one of two or more groups, the identifiers in each group identifying a respective group of synonymous words; each of the identifiers being stored at a respective position; the method comprising computer-implemented steps of:
using an instance of a first word to obtain an identifier of the first word;
accessing the data structure to compare the identifier of the first word with the identifiers in groups in the data structure;
when the accessing step finds one of the grouped identifiers which matches the identifier of the first word, retrieving other identifiers in the same group as the matching grouped identifier and determining part of speech information about the group from the respective position at which the matching grouped identifier is stored; and
using each retrieved identifier from the same group as the matching grouped identifier to obtain an instance of the respective word uniquely identified by each retrieved identifier so that the respective tokens together represent all the words in the respective group of synonymous words.

23. A computer-implemented method of using a data structure stored in computer-accessible memory that includes two or more numbers from a dense set of numbers, each number having a value that identifies one of a set of types, each number being in one of two or more groups, the numbers in each group being sorted numerically, each number having first and second parts; the method comprising computer-implemented steps of:
using a first token of a respective one of the types to obtain a first number that uniquely identifies the first token's respective type, the first number having first and second parts;
accessing the data structure to compare the first number with the numbers in groups in the data structure; the step of accessing the data structure comprising a substep of comparing the first number with one of the numbers in a first one of the groups and determining whether to skip the remaining numbers in the first group based on the comparison; the substep of comparing the first number comprising a substep of comparing the first part of the first number with the first part of the number in the first group and, if equal, comparing the second part of the first number with the second part of the number in the first group; and
upon finding one of the grouped numbers which matches the first number, retrieving other numbers in the same group as the matching grouped number.

24. A computer-implemented method of producing a data structure stored in computer-accessible memory that includes two or more identifiers, each identifier having a value that identifies one of a set of words, the method comprising computer-implemented steps of:
ordering two or more groups of instances of the words into a word group sequence, the words in each group being related; each group including part of speech data indicating a part of speech of words in the group; the step of ordering the groups of word instances comprising a substep of ordering the groups by part of speech based on the part of speech data;
obtaining groups of identifiers by using each of the words of each group of word instances to obtain a respective identifier, each word's respective identifier identifying the word; each group of identifiers identifying the respective words in a respective one of the groups of word instances; the groups of identifiers being ordered according to the word group sequence;
ordering the identifiers into an identifier sequence so that the part of speech of the respective group of word instances of each group of identifiers can be determined from the position in the identifier sequence of any of the identifiers in the group; and
storing the identifiers in computer-accessible memory with the identifiers positioned in the identifier sequence.

25. The method of claim 24 in which the words in each group are synonyms.

26. A system comprising:
memory storing a data structure and instruction data;
the data structure including two or more identifiers, each identifier having a value that identifies one of a set of types, each identifier having a respective position in a sequence in the data structure, each identifier identifying a respective one of the types; each identifier being in one of two or more groups of identifiers, each group identifying a respective group of the types; each group including, for each type in the respective group of types, a single identifier identifying the type; each group having a respective characteristic; the identifiers being ordered in the sequence so that the respective characteristic of each group can be determined from the respective position in the sequence of any of the identifiers in that group; and a processor connected for accessing the data structure and instruction data in memory; the instruction data indicating instructions the processor can execute; the processor, in executing the instructions:

obtaining a candidate identifier identifying one of the types;

accessing the data structure to compare the candidate identifier with the identifiers in the data structure; and determining the respective characteristic of one of the groups from the respective position in the sequence of one of the identifiers in the group that matches the candidate identifier.

27. A computer-implemented method of producing a data structure that includes two or more identifiers, each identifier having a value that identifies one of a set of types of linguistic items, the method comprising computer-implemented steps of:

obtaining groups of the identifiers, each group identifying a respective group of the types of linguistic items; each group of identifiers including, for each type in the respective group of types of linguistic items, a single identifier identifying the type;

ordering the identifiers in the groups so that each identifier has a respective position in a sequence of identifiers and so that the respective positions in the sequence of all of the identifiers of each group can be determined from the respective position in the sequence of any of the identifiers in that group; and storing the identifiers in computer-accessible memory with the identifiers positioned in the sequence.

28. The method of claim 27 in which the step of obtaining the groups of the identifiers comprises substeps of:

ordering two or more groups of tokens into a token group sequence, each token being an instance of a respective one of the types; the tokens of each group being instances of the types in a respective one of the groups of types; and using each of the tokens to obtain the respective identifier of the respective type, thereby obtaining the groups of identifiers.

29. The method of claim 28 in which each token group includes group data indicating a characteristic of the group; the substep of ordering the groups of tokens comprising a substep of ordering the groups of tokens based on the group data.

30. The method of claim 27, further comprising a step of including each identifier in the data structure in parts, at least one part of each identifier having a length less than a full byte length, the full byte length being an integral multiple of each part's length so that a comparison with any of the parts can be made in a single machine cycle.

31. A computer-implemented method of producing a data structure stored in computer-accessible memory that includes two or more identifiers, each identifier having a value that identifies one of a set of types of linguistic items, the method comprising computer-implemented steps of:

including the identifiers in groups, each group identifying a respective group of the types of linguistic items, each group including, for each type in the respective group of types of linguistic items, a single identifier identifying the type, each group having a respective characteristic;

ordering the identifiers so that each identifier has a respective position in a sequence of identifiers and so that the respective characteristic of each group can be determined from the respective position in the sequence of any of the identifiers in the group; and storing the identifiers in computer-accessible memory with the identifiers positioned in the sequence.

32. The method of claim 31 in which the respective characteristic of each group is a number of identifiers in the group.

33. The method of claim 31 in which each type is a word, the respective characteristic of each group being a part of speech of the words identified by the identifiers in the group.

34. A computer-implemented method of producing a data structure stored in computer-accessible memory that includes two or more identifiers, each identifier having a value that identifies one of a set of types of linguistic items, the method comprising computer-implemented steps of:

ordering two or more groups of tokens into a token group sequence, each token being an instance of a respective one of the types of linguistic items, the respective types of the tokens in each group of tokens being related; each group of tokens including group data indicating information about the group of tokens; first and second ones of the groups of tokens including the same group data; the step of ordering the groups of tokens comprising a substep of ordering the first and second groups of tokens according to the number of tokens in each group;

obtaining groups of identifiers by using each of the tokens of each group of tokens to obtain a respective identifier, each token's respective identifier identifying the token's respective type; each group of identifiers identifying the respective types of the tokens in a respective one of the groups of tokens; the groups of identifiers being ordered according to the token group sequence;

ordering the identifiers into an identifier sequence so that the information about the respective group of tokens of each group of identifiers can be determined from the position in the identifier sequence of any of the identifiers in the group; and storing the identifiers in computer-accessible memory with the identifiers positioned in the identifier sequence.

35. The method of claim 34 in which the step of ordering the identifiers further comprises ordering the identifiers so that each group includes respective first and last identifiers, the method further comprising a step of creating a location table for the data structure, the location table including location data indicating, for the identifier groups obtained from the token groups including the same group data, the positions in the identifier sequence of the respective first and last identifiers in those groups.

36. The method of claim 35 further comprising a step of creating a group length table for the data structure, the group length table including length data indicating, for a given number of identifiers, the number of the groups of identifiers obtained from the token groups including the same group data that include the given number of identifiers.

37. The method of claim 36 in which the step of creating the group length table comprises a substep of including sufficient length data so that if an identifier has a position between the positions indicated by the location data as the respective first and last identifiers of one of the identifier groups, a number of identifiers in that group and the positions of its identifiers can be determined using the length data for the number of identifiers in that group.

38. A computer-implemented method of producing a data structure stored in computer-accessible memory that includes two or more numbers, each number having a value that identifies one of a set of types of linguistic items, the method comprising computer-implemented steps of:

obtaining two or more groups of the numbers, the numbers in each group identifying a respective group of the types of linguistic items, each number identifying a respective one of the types of linguistic items; the types in each respective group being related;

ordering the numbers in the groups into a sequence so that each number has a respective position in the sequence and so that information about each group can be determined from the respective position in the sequence of any of the numbers in that group; and storing the numbers in computer-accessible memory with the numbers positioned in the sequence;

the step of ordering the numbers into the sequence comprising substeps of:

ordering the numbers within each group numerically so that each group has a first number; and ordering groups of numbers having the same number of numbers numerically according to the first number in each group.

39. An article of manufacture for use in a system that includes a processor; the article comprising:

memory for storing data; data stored by the memory being accessible by the processor when the article of manufacture is used; and identifier group data stored in the memory so that the processor can access the identifier group data when the article of manufacture is used; the identifier group data comprising:

two or more identifiers, each identifier having a value that identifies one of a set of types, each identifier having a respective position in a sequence in the identifier group data, each identifier identifying a respective one of the types so that the processor can access the identifier group data with a candidate identifier identifying one of the set of types to compare the candidate identifier with the identifiers in the identifier group data; each identifier being in one of a set of two or more groups of identifiers, each group identifying a respective group of the types; each group of identifiers including, for each type in the respective group of types, a single identifier identifying the type; the identifiers being ordered in the sequence so that the processor can determine the respective positions in the sequence of all of the identifiers of each group from the respective position in the sequence of any of the identifiers in that group that matches the candidate identifier.

40. An article of manufacture for use in a system that includes a processor; the article comprising:

memory for storing data; data stored by the memory being accessible by the processor when the article of manufacture is used; and identifier group data stored in the memory so that the processor can access the identifier group data when the article of manufacture is used; the identifier group data comprising:

two or more identifiers, each identifier having a value that identifies one of a set of types, each identifier having a respective position in a sequence in the identifier group data so that the processor can access each identifier based on the identifier's position in the sequence, each identifier identifying one of the types so that the processor can use each identifier to obtain data indicating the type it identifies; each identifier being in one of a set of two or more groups of identifiers, each group identifying a respective group of the types; each group of identifiers including, for each type in the respective group of types, a single identifier identifying the type; the identifiers being ordered in the sequence so that the processor can determine information about the respective group of types of each group of identifiers from the respective position in the sequence of any of the identifiers in the group.

41. The article of manufacture of claim 40 in which the identifiers are ordered in the sequence so that the identifiers in each group of identifiers are together; each group of identifiers having a respective number of identifiers; the groups of identifiers being ordered in the sequence so that the processor can determine the respective number of identifiers of each group from the respective position in the sequence of any of the identifiers in the group.

42. The article of manufacture of claim 40 in which the identifiers are ordered in the sequence so that the identifiers in each group of identifiers are together; the groups of identifiers being ordered in the sequence so that the processor can determine the respective positions in the sequence of all of the identifiers of each group from the respective position in the sequence of any of the identifiers in the group.

43. The article of manufacture of claim 40 in which the type identified by each identifier is a word, the identifiers being ordered in the sequence so that the identifiers in each group of identifiers are together; each group of identifiers including identifiers identifying a group of words that have a respective part of speech, the groups of identifiers being ordered by part of speech so that the processor can determine the respective part of speech for each group of identifiers from the respective position in the sequence of any of the identifiers in the group.

44. A product for use in a system that includes a processor; the product comprising:

memory for storing data; data stored by the memory being accessible by the processor when the product is used; and identifier group data stored in the memory so that the processor can access the identifier group data when the product is used; the identifier group data comprising:

two or more identifiers ordered in a sequence; each identifier having a value that identifies one of a set of types so that the processor can compare an identifier it accesses with a candidate identifier identifying one of the set of types; each identifier being in one of a set of two or more groups of identifiers, each group of identifiers identifying a group of the types; each group of identifiers including, for each type in the group of types it identifies, a single identifier identifying the type; the identifiers being ordered in the sequence so that the processor can, for each group of identifiers, use the position in the sequence of any of the identifiers in the group that matches the candidate identifier to obtain data indicating the positions in the sequence of all of the identifiers in the group of identifiers.

45. A product for use in a system that includes a processor; the product comprising:

memory for storing data; data stored by the memory being accessible by the processor when the product is used; and identifier group data stored in the memory so that the processor can access the identifier group data when the product is used; the identifier group data comprising:

two or more identifiers ordered in a sequence; each identifier having a position in the sequence so that the processor can access each identifier based on the identifier's position in the sequence; each identifier having a value that identifies one of a set of types so that the processor can use an identifier it accesses to obtain data indicating the type identified by the identifier's value; each identifier being in one of a set of two or more groups of identifiers, each group of identifiers identifying a group of the types; each group of identifiers including, for each type in the group of types it identifies, a single identifier identifying the type; the identifiers being ordered in the sequence so that the processor can, for each group of identifiers, use the position in the sequence of any of the identifiers in the group of identifiers to obtain data indicating information about the group of types identified by the group of identifiers.

46. A product for use in a system that includes a processor; the product comprising:

memory for storing data; data stored by the memory being accessible by the processor when the product is used;

instruction data stored in the memory; the instruction data indicating instructions the processor can execute; and identifier group data stored in the memory; the identifier group data comprising two or more identifiers ordered in a sequence, each identifier having a position in the sequence; each identifier having a value that identifies one of a set of types; each identifier being in one of a set of two or more groups of identifiers, each group of identifiers identifying a group of the types; each group of identifiers including, for each type in the group of types it identifies, a single identifier identifying the type;

the instruction data indicating instructions that, when executed by the processor, cause the processor to:

obtain a candidate identifier that identifies one of the set of types;

access identifiers in the identifier group data and compare the accessed identifiers with the candidate identifier; and upon accessing an identifier that matches the candidate identifier, obtain data indicating information about a group of identifiers that includes the accessed identifier.

* * * * *